US009017239B2

(12) United States Patent
Ishida et al.

(10) Patent No.: US 9,017,239 B2

(45) Date of Patent: Apr. 28, 2015

(54) ELECTROPHOTOGRAPHIC MEMBER, PROCESS CARTRIDGE AND ELECTROPHOTOGRAPHIC APPARATUS

(75) Inventors: Kazutoshi Ishida, Mishima (JP); Hidenori Satoh, Odawara (JP); Tomoya Uesugi, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 294 days.

(21) Appl. No.: 13/615,433

(22) Filed: Sep. 13, 2012

(65) Prior Publication Data

US 2013/0004202 A1 Jan. 3, 2013

Related U.S. Application Data

(63) Continuation of application No. PCT/JP2012/003747, filed on Jun. 8, 2012.

(30) Foreign Application Priority Data

Jun. 15, 2011 (JP) ................................ 2011-133744

(51) Int. Cl.

*F16C 13/00* (2006.01)
*G03G 15/02* (2006.01)
*G03G 15/08* (2006.01)

(52) U.S. Cl.

CPC ........ *G03G 15/0233* (2013.01); *G03G 15/0818* (2013.01)

(58) Field of Classification Search

USPC .......................................... 492/49, 53, 54, 56

See application file for complete search history.

(56) References Cited

U.S. PATENT DOCUMENTS

| | | | |
|---|---|---|---|
| 7,727,134 B2 | 6/2010 | Nakamura et al. | |
| 7,798,948 B2 | 9/2010 | Kawamura et al. | |
| 7,947,339 B2 | 5/2011 | Yamauchi et al. | |
| 2012/0058300 A1* | 3/2012 | Finn et al. | 428/141 |
| 2012/0201568 A1 | 8/2012 | Kurachi et al. | |

FOREIGN PATENT DOCUMENTS

| | | |
|---|---|---|
| EP | 1 947 526 A1 | 7/2008 |
| EP | 1 947 527 A1 | 7/2008 |
| EP | 2 128 717 A1 | 12/2009 |
| JP | 1-142749 A | 6/1989 |
| JP | 1-257881 A | 10/1989 |

(Continued)

OTHER PUBLICATIONS

International Preliminary Report on Patentability, International Application No. PCT/JP2012/003747, Mailing Date Jan. 3, 2014.

(Continued)

*Primary Examiner* — Christopher Besler

(74) *Attorney, Agent, or Firm* — Fitzpatrick, Cella, Harper and Scinto

(57) ABSTRACT

An electrophotographic member whose performances are hardly changed even after a long-term use is provided. An electrophotographic member having a mandrel, an elastic layer and a surface layer, wherein the surface layer contains a titanium oxide film having chemical bonds represented by the following formula (1) and formula (2) is provided.

O—Ti—O Formula (1)

Ti—O—C Formula (2)

4 Claims, 3 Drawing Sheets

(56) References Cited

FOREIGN PATENT DOCUMENTS

| | | | |
|---|---|---|---|
| JP | 2003-183427 | A | 7/2003 |
| JP | 2006-293004 | A | 10/2006 |
| JP | 2007-78947 | A | 3/2007 |
| JP | 2010-2567 | A | 1/2010 |
| JP | 2011-59220 | A | 3/2011 |

OTHER PUBLICATIONS

Uesugi, et al., U.S. Appl. No. 13/742,176, filed Jan. 15, 2013.

PCT International Search Report dated Jul. 10, 2012 in International Application No. PCT/JP2012/003747.

European Search Report dated Oct. 24, 2014 in European Application No. 12800588.1.

* cited by examiner

ELECTROPHOTOGRAPHIC MEMBER, PROCESS CARTRIDGE AND ELECTROPHOTOGRAPHIC APPARATUS

CROSS-REFERENCE TO RELATED APPLICATIONS

This application is a continuation of International Application No. PCT/JP2012/003747, filed Jun. 8, 2012, which claims the benefit of Japanese Patent Application No. 2011-133744, filed Jun. 15, 2011.

BACKGROUND OF THE INVENTION

1. Field of the Invention

The present invention relates to an electrophotographic member for use in a developing member, a charging member and the like, a process cartridge and an electrophotographic apparatus.

2. Description of the Related Art

In an electrophotographic apparatus, a developing roller is generally configured to have an elastic layer so as to ensure a sufficient nip width with respect to a photosensitive drum to thereby stably rotate. The developing roller has a surface layer formed in order to make the toner conveying ability of a surface better and suppress toner fixation on the surface.

A charging roller which is placed while being in contact with the photosensitive drum and which allows the photosensitive drum to be charged at a predetermined potential is also generally configured to have an elastic layer and a surface layer as in the developing roller.

Meanwhile, as there is an increasing demand for more improvement in durability of an electrophotographic apparatus, there is also a demand for electrophotographic members such as a developing roller and a charging roller whose changes in performance after a long-term use are smaller.

In regard to such demands, in order to improve durability of a conductive roller in the vicinity of a surface, Japanese Patent Application Laid-Open No. H01-257881 has proposed a developing roller provided with a ceramics coating layer having a thickness of 5 μm or less on the surface of the roller. Japanese Patent Application Laid-Open No. H01-142749 has proposed a developing roller and a developer regulating member whose surfaces are coated with ceramics having titanium and tungsten atoms.

SUMMARY OF THE INVENTION

However, according to studies by the present inventors, the above surface layer containing ceramics has a high durability by itself, while the surface layer has a high hardness. Therefore, in the case where a conductive roller provided with such a surface layer is used as a developing roller, a so-called filming phenomenon in which a toner is fixed on the surface of the developing roller may occur.

If such filming occurs, charging performance to a toner and surface properties may be changed to thereby cause changes in the density of an electrophotographic image, and the like, before and after the occurrence of such filming. Also in the case where the conductive roller according to the above patent literatures is used as a charging roller, toner fixation on the surface may occur to thereby cause uneven charging in a photosensitive drum.

Then, the present invention is directed to providing an electrophotographic member excellent in durability, whose performances are hardly changed even after a long-term use.

Further, the present invention is directed to providing a process cartridge and an electrophotographic apparatus which can stably form a high quality electrophotographic image.

According to one aspect of the present invention, there is provided an electrophotographic member having a mandrel, an elastic layer and a surface layer, wherein the surface layer consists of a titanium oxide film having chemical bonds represented by the following formulae (1) and (2):

O—Ti—O    Formula (1)

Ti—O—C    Formula (2).

According to another aspect of the present invention, there is provided a process cartridge comprising the above electrophotographic member, and configured to be attachable to and removable from a main body of an electrophotographic apparatus. According to further aspect of the present invention, there is provided an electrophotographic apparatus comprising the above electrophotographic member.

According to the present invention, an electrophotographic member whose performances are hardly changed even after a long-term use and which is conducive to the stable formation of an electrophotographic image can be obtained.

According to the present invention, a process cartridge and an electrophotographic apparatus which can form a high quality electrophotographic image are provided.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1A:
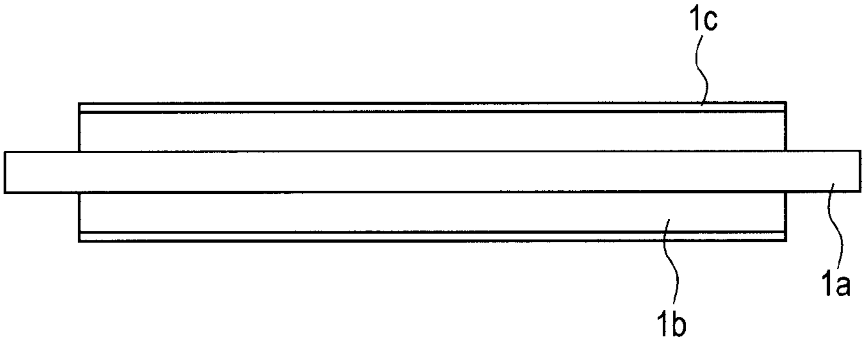
FIG. 1A is a cross-sectional schematic view of a roller-shaped electrophotographic member (electrophotographic conductive roller) according to the present invention.
Figure 1B:
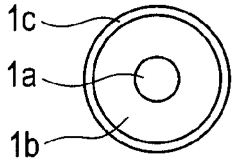
FIG. 1B is a cross-sectional schematic view of a roller-shaped electrophotographic member (electrophotographic conductive roller) according to the present invention.

An electrophotographic member according to the present invention is used for a developing roller, a charging roller and the like in an electrophotographic apparatus. FIGS. 1A and 1B each illustrate a cross-sectional schematic view of one example of a conductive roller of the present invention. FIGS. 1A and 1B are cross-sectional schematic views in cutting the conductive roller parallel and perpendicular to the axial direction of a mandrel, respectively. The conductive roller has an elastic layer 1*b* on the outer periphery of a mandrel 1*a*, and a surface layer 1*c* on the outer periphery of the elastic layer 1*b*.

(Mandrel)

Any mandrel can be applied to the present invention as long as the mandrel serves as an electrode of a conductive member and a supporting member. As materials for such a mandrel, for example, metals or alloys, such as aluminum, copper, stainless steel and iron, and conductive materials such as conductive synthetic resins can be used.

(Elastic Layer)

The elastic layer can be a layer for allowing the conductive roller to have elasticity, in order for the roller to be brought into contact with a photosensitive drum or a developer regulating member while having an appropriate area at the time of pressure-contact with the photosensitive drum or the developer regulating member. Unless deviating from such an object, the elastic layer can be a single layer or a multilayer.

The elastic layer for use in the present invention can be prepared using any known material in a conductive roller for an electrophotographic apparatus, and for example, the following rubbers and conducting agents can be used as the material.

Examples of the rubber include ethylene-propylene-diene copolymer rubbers (EPDM), acrylonitrile-butadiene rubbers (NBR), chloroprene rubbers (CR), natural rubbers (NR), isoprene rubbers (IR), styrene-butadiene rubbers (SBR), fluororubbers, silicone rubbers, epichlorohydrin rubbers, butadiene rubbers (BR), hydrogenated products of NBR, polysulfide rubbers and urethane rubbers. It is to be noted that one kind or a mixture of several kinds of the above rubbers can also be used for the elastic layer.

As the conducting agent compounded in the elastic layer, for example, carbon black can be used, and there is no limitations on carbon black which can be used. Examples include acetylene blacks high in conductivity and furnace blacks such as SAF, ISAF, HAF, MAF, FEF, GPF and SRF. Herein, the resistance of the conductive roller can be $1.0\times10^2$ to $1.0\times10^{12}$, and thus the amount of carbon black added is preferably 1 part by mass or more and 80 parts by mass or less, and more preferably in a range of 2 parts by mass or more and 70 parts by mass or less, based on 100 parts by mass of the rubber.

Other conducting agent can be used in combination with carbon black, if necessary. Examples include various conductive metals or alloys, such as graphite, aluminum, copper, tin and stainless steel, and metal oxides obtained by subjecting tin oxide, zinc oxide, indium oxide, titanium oxide, tin oxide-antimony oxide solid solution, and the like to respective conducting treatments. Herein, the resistance of the conductive roller can be $1.0\times10^2$ to $1.0\times10^{12}$, and thus the amount of the other conducting agent added is preferably 2 parts by mass or more and 20 parts by mass or less, and more preferably in a range of 5 parts by mass or more and 18 parts by mass or less, based on 100 parts by mass of the rubber.

As other various additives, any known additives in the conductive roller for an electrophotographic apparatus can be used. For example, a reinforcing agent and a heat transfer improving agent, such as hydrophilic silica, hydrophobic silica, quartz, calcium carbonate, aluminum oxide, zinc oxide and titanium oxide, can also be added if necessary.

As a production method for providing the elastic layer on the mandrel, any known method in an electrophotographic conductive roller can be used. Examples include a method of extruding the mandrel and the material for the elastic layer together for molding, and a method in which, when the material for forming the elastic layer is liquid, the material is poured into a mold provided with a cylindrical pipe, holding members provided on both ends of the pipe, for holding the mandrel, and the mandrel, and heated and cured.

The elastic layer can also be a single layer or a multilayer as described above. For example, for the purpose of providing asperity on the periphery of a first elastic layer formed by using the rubber and the conducting agent, a second elastic layer can be provided.

In the case where a rubber layer having a thickness of several μm to several mm is provided as the second elastic layer, the rubber layer can be provided using a material for forming the second elastic layer by any known method in the electrophotographic roller. In the case where a resin layer is provided as the second elastic layer, any known resin can be used as the material. Specific examples include fluorine resins, polyamide resins, acrylic urethane resins, phenol resins, melamine resins, silicone resins, urethane resins, polyester resins, polyvinyl acetal resins, epoxy resins, polyether resins, amino resins, acrylic resins, urea resins and mixtures of these resins.

When the resin layer is provided as the second elastic layer, a resin having carbon black added thereto can be used. Examples include carbon black having a high conductivity, such as EC300J and EC600JD (both are trade names, produced by Lion Corporation), and carbon black for rubbers or carbon black for coating materials, having a moderate conductivity. Carbon black for coating materials can be used from the viewpoint of control of dispersibility and conductivity. Since the conductive roller can have a moderate resistance, the amount of carbon black compounded can be 3 parts by mass or more and 30 parts by mass or less based on 100 parts by mass of a resin component.

As a method for providing a resin layer having a thickness of several μm to several tens μm as the second elastic layer, for example, there is a method in which the resin layer is obtained by mixing and dispersing the resin component and carbon black with and in a solvent to form a coating liquid, and coating the coating liquid on the first elastic layer.

As the solvent for use in the coating liquid, a solvent can be appropriately used as long as the solvent dissolves the resin for use in the resin layer. Examples include ketones such as methyl ethyl ketone and methyl isobutyl ketone, hydrocarbons such as hexane and toluene, alcohols such as methanol and isopropanol, esters and water. Methyl ethyl ketone and methyl isobutyl ketone can be particularly used from the viewpoints of solubility of the resin and boiling point.

(Surface Layer)

The surface layer contains a titanium oxide film having chemical bonds represented by the following formula (1) and formula (2), respectively.

O—Ti—O Formula (1)

Ti—O—C Formula (2)

Namely, in the titanium oxide film according to the present invention, at least one portion of titanium atoms forming the titanium oxide film is bound to carbon atoms via oxygen atoms. The titanium oxide film having such a configuration enables providing high flexibility for the titanium oxide film and high adhesiveness for the elastic layer. Herein, the respective chemical bonds of the formula (1) and the formula (2) in the surface layer can be identified by using a scanning photoelectron spectrometer.

The amount of the bond represented by the formula (2) in the titanium oxide film can be 20% or more and 80% or less based on the total number of Ti atoms of the formula 1 and the formula 2 in terms of the number of Ti atoms. Such a range enables providing for the surface layer high durability and sufficient elasticity for suppressing the filming of a toner.

A conventional conductive roller in which a titanium oxide film containing only the bond represented by the formula (1) is formed on an elastic layer as a surface layer has caused the filming of a toner in some cases because the hardness of the surface layer is high and the smoothness of the surface is low.

On the other hand, since at least one portion of titanium atoms forming the titanium oxide film is bound to carbon atoms via oxygen atoms in the present invention, the density of the titanium oxide film is reduced on some level. Therefore, it is considered that, as compared with the conventional titanium oxide film, the titanium oxide film of the present invention is rich in flexibility and excellent in conformability to deformation of the elastic layer, and peeling off of the surface layer from the elastic layer during use is suppressed.

The titanium oxide film according to the present invention can have a surface resistance of $1.0\times10^7\Omega/\square$ or more and $1.0\times10^{11}\Omega/\square$ or less. Therefore, the surface layer according to the present invention is resistant to electrostatic adhesion to a toner as compared with a surface layer containing insulating ceramics. Herein, the surface layer having conductivity means that the surface resistance of the surface layer is $1\times10^3\Omega/\square$ or more and $1\times10^{13}\Omega/\square$ or less. In addition, the surface layer having insulating properties means that the surface resistance of the surface layer is more than $1\times10^{13}\Omega/\square$. The surface resistance of the titanium oxide film (surface layer) can be specified by forming a film on a polyester film and measuring the surface resistance of the formed film by using an ultrahigh resistance/microammeter: R8340 (trade name, Advantest Corporation).

The thickness of the surface layer is preferably 5 nm or more and 1 μm or less, and particularly preferably 10 nm or more and 0.9 μm or less, from the viewpoints of intensity and flexibility as the surface layer.

<Production Method of Titanium Oxide Film>

The titanium oxide film according to the present invention can be formed by, for example, a physical vapor deposition (PVD) method such as vacuum vapor deposition and ion plating, a chemical vapor deposition (CVD) method such as plasma CVD, thermal CVD and laser CVD, or a sol-gel method.

Figure 4:
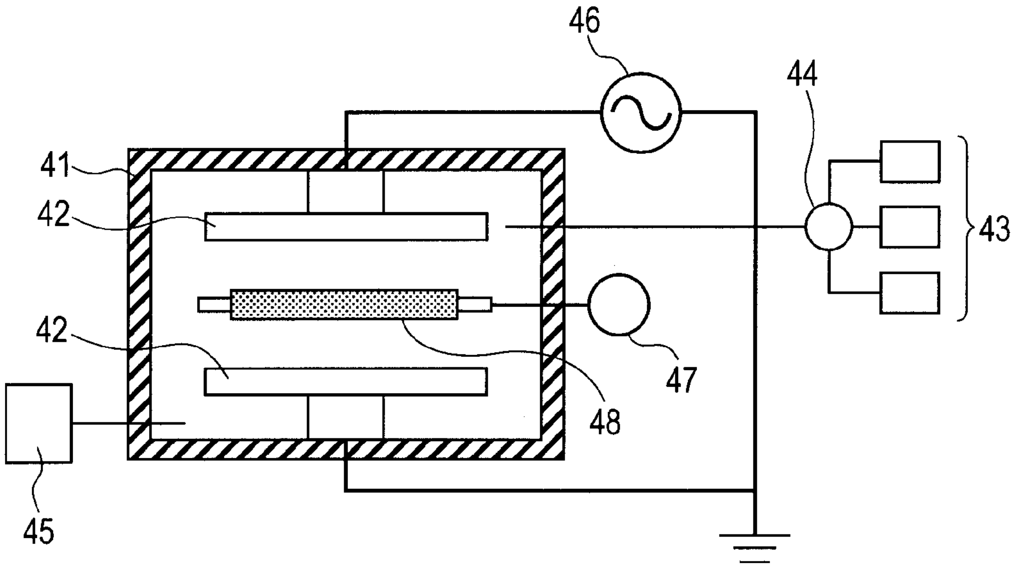
FIG. 4 is an illustrative view relating to a CVD apparatus which can be used for forming a surface layer according to the present invention.

In the case where a titanium oxide film containing titanium atoms bound to alkyl groups via oxygen atoms (hereinafter, referred to also as an "alkoxy-modified titanium oxide film") is produced by, for example, a plasma CVD method, the titanium oxide film can be formed by, for example, the following apparatus and procedure. Namely, such an apparatus has, as illustrated in FIG. 4, a vacuum chamber 41, two plate electrodes 42 placed in parallel, a raw material gas cylinder and a raw material liquid tank 43, a raw material supply unit 44, a unit 45 for exhausting the gas in the chamber, a high-frequency supply power source 46 for supplying a high-frequency wave, and a motor 47 for rotating an elastic roller 48.

Procedure (1)

Place the elastic roller 48 having an elastic layer formed on a mandrel between the two plate electrodes 42, and rotate the mandrel around the axis by driving the motor 47 so that the alkoxy-modified titanium oxide film is uniformly formed.

Procedure (2)

Evacuate the inside of the vacuum chamber 41 until reaching, specifically, for example, 2 Pa or less, preferably, 1 Pa or less, by the exhaust unit.

Procedure (3)

Introduce a raw material gas through a raw material introduction port, confirm that the inside of the vacuum chamber 41 reaches the constant pressure, and thereafter supply a high-frequency power to the plate electrodes 42 by the high-frequency supply power source 46 to generate plasma for forming a film.

Procedure (4)

After a lapse of a predetermined period, stop the supply of the raw material gas and the high-frequency power, introduce (leak) air or nitrogen into the vacuum chamber 41 until reaching atmospheric pressure, and take out the elastic roller having the alkoxy-modified titanium oxide film formed on the surface of the roller.

According to the procedures as described above, the conductive roller having the alkoxy-modified titanium oxide film can be produced. It is to be noted that many elastic rollers 48 may be simultaneously treated by plasma CVD as long as the rollers are placed under a uniform plasma atmosphere.

Herein, gaseous or gasified titanium tetraalkoxide is usually used as the raw material gas, and, if necessary, the titanium tetraalkoxide is introduced together with an inert gas such as argon or helium or an oxidizing gas.

Examples of the titanium tetraalkoxide include a compound represented by the following formula (3).

$$Ti(OR)_4 \qquad \text{formula (3)}$$

In the formula (3), R represents a linear or branched-chain alkyl group having 2 to 18 carbon atoms.

Specific examples include the following: titanium tetraethoxide, titanium tetraisopropoxide, titanium tetra-n-butoxide, titanium tetra-tert-butoxide and titanium tetra-2-ethyl hexoxide.

The titanium tetraalkoxides can be used singly or as a mixture of a plurality of the titanium tetraalkoxides.

The alkoxy-modified titanium oxide film according to the present invention can also be produced by controlled hydrolysis and condensation of the titanium tetraalkoxide. Namely, the alkoxy-modified titanium oxide film according to the present invention can contain the hydrolytic condensate of the titanium tetraalkoxide. One specific example of such a production method includes a sol-gel method.

In the sol-gel method, the titanium tetraalkoxide is first added to a mixed solvent of an alcohol and water. The mixing ratio of an alcohol and water can be set without any limitation as long as the titanium tetraalkoxide is dissolved. As such an alcohol, alcohols soluble in water, such as methanol, ethanol, isopropyl alcohol and tert-butyl alcohol, can be arbitrarily used.

Thereafter, in order to modulate viscosity and improve coatability, if necessary, the titanium tetraalkoxide is diluted with a solvent such as methyl ethyl ketone and ethyl acetate, then applied onto the periphery of the roller provided with the elastic layer, and heated to allow a hydrolytic product to be condensed, thereby obtaining the alkoxy-modified titanium oxide film. Herein, with respect to the heating conditions during hydrolysis and condensation, the heating temperature is preferably 160° C. or higher and 300° C. or lower, and particularly preferably 160° C. or higher and 180° C. or lower, and the heating time can be 1 hour or more and 5 hours or less, in order to suppress the reaction of all alkoxy groups by hydrolysis and condensation.

When the surface potential of the conductive roller of the present invention, having the alkoxy-modified titanium oxide film on the surface, is defined as Vp, and the surface potential of the conductive roller in which the surface layer is removed and which has an elastic layer on the surface is defined as Ve, Vp/Ve can be 0.10 or more and 10.00 or less ($0.10\leq Vp/Ve\leq10.00$). It is to be noted that Ve can be the surface potential of the elastic layer or can be the surface potential of the second elastic layer when the elastic layer has a two-layer structure.

The above range of Vp/Ve allows the potential in the vicinity of the surface of the developing roller to be kept within an optimal range, in the case where the electrophotographic member according to the present invention is used as the developing roller, and therefore the ability to provide a friction charge for a toner can be further stabilized. In addition, adhesion of a toner and generation of a ghost image on the surface of the developing roller due to excessive charging of a toner can be suppressed with more certainty.

Herein, the surface potential of the conductive roller can be measured by the following method. Namely, the surface potential can be determined by using a dielectric relaxation analysis system of a semi-insulating device, manufactured by Quality Engineering Associates, Inc., to measure surface potentials in respective points obtained by dividing the conductive roller into 260 in the longitudinal direction and into 18 in the circumferential direction, and calculating the mean value of the surface potentials.

From the viewpoint of optimizing the elastic modulus of the titanium oxide film according to the present invention, an abundance ratio ($C_{C—C}/O_{C—O}$) of an abundance ratio of an oxygen atom bound to a carbon atom, ($O_{C—O}$), to a carbon atom bound to a carbon atom, ($C_{C—C}$), is preferably 3 or more and 8 or less, and particularly preferably 3 or more and 6 or less.

It is to be noted that the proportion ($C_{C—C}/O_{C—O}$) of the abundance ratio of an oxygen atom bound to a carbon atom to the abundance ratio of a carbon atom bound to a carbon atom can be calculated by measuring the abundance ratio ($O_{C—O}$) of an oxygen atom of a carbon atom-oxygen atom bond and the abundance ratio ($C_{C—C}$) of a carbon atom of a carbon atom-carbon atom bond in terms of amount by using a scanning X-ray photoelectron spectrometer, and determining the proportion of both the abundance ratios. As an analyzing apparatus in this case, PHI 5000 VersaProbe (trade name, ULVAC-PHI, Incorporated) can be used.

(Electrophotographic Apparatus and Developing Apparatus)

Figure 2:
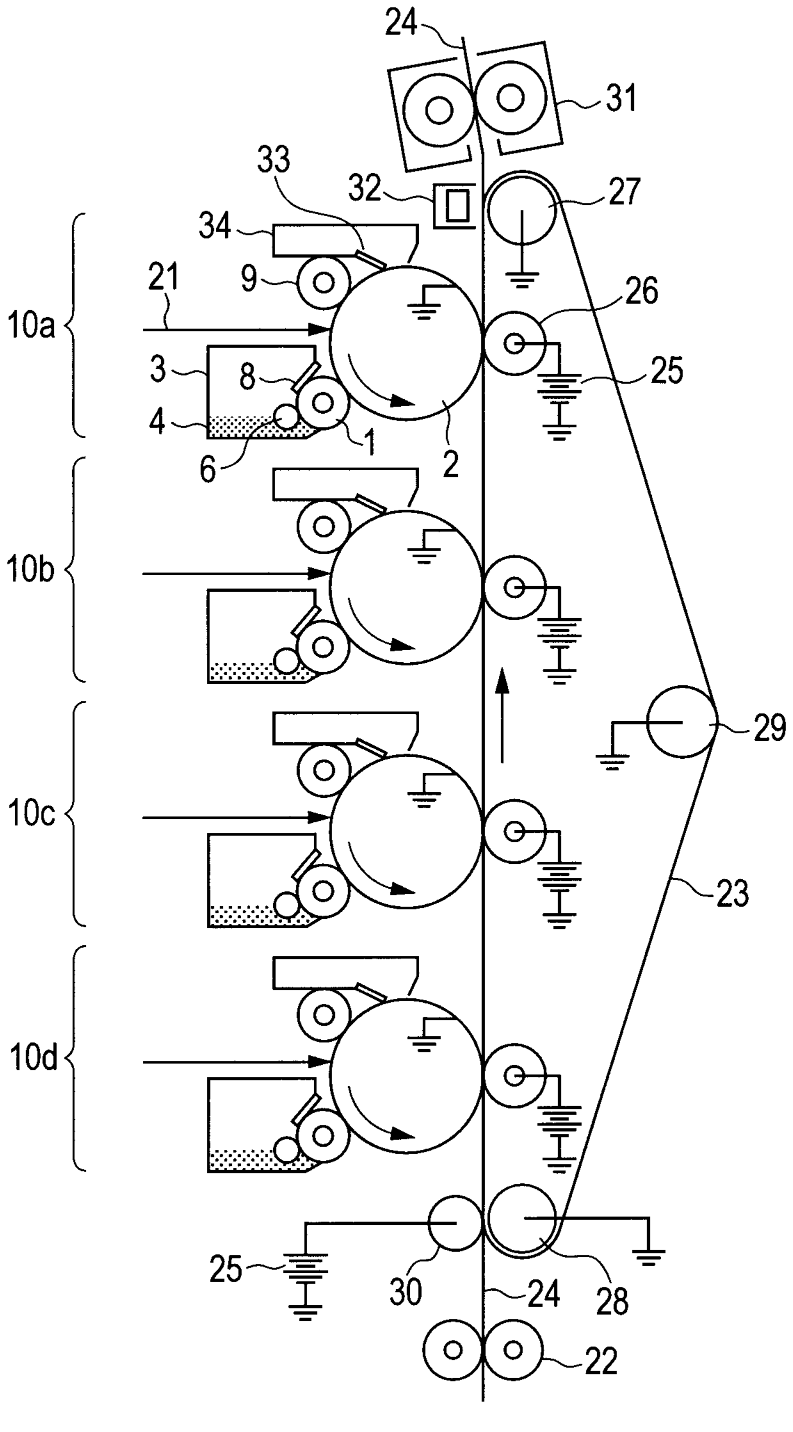
FIG. 2 is a schematic view of one example of an electrophotographic apparatus according to the present invention.

One example of an electrophotographic apparatus for which the conductive roller of the present invention can be used is illustrated in FIG. 2. It is to be noted that in this example, the conductive roller of the present invention is used as a developing roller. A color electrophotographic apparatus illustrated in the schematic view of FIG. 2 has developing apparatuses (for each color) (10*a* to 10*d*) in a tandem form, which are provided for respective color toners of yellow Y, magenta M, cyan C and black BK.

The developing apparatuses, whose specifications are slightly different from one another depending on properties of respective color toners, basically have the same structure. Each developing apparatus is provided with a photosensitive drum 2 which rotates in the arrow direction. A charging roller 9 for uniformly charging the photosensitive drum 2, a light exposure unit for irradiating the uniformly charged photosensitive drum 2 with laser light 21 to form an electrostatic latent image, and a hopper 3 for supplying a toner to the photosensitive drum 2, on which the electrostatic latent image is formed, to develop the electrostatic latent image are provided around the developing apparatus. Furthermore, a transfer member is provided which has a transfer roller 26 for transferring a toner image on the photosensitive member 2 onto a recording medium (transfer material) 24 such as paper which is fed by a paper-feeding roller 22 and conveyed by a conveying belt 23, while a voltage from a bias power source 25 is applied from the back surface of the recording medium 24.

The conveying belt 23 is suspended on a driving roller 27, a driven roller 28 and a tension roller 29, and is controlled so as to move in synchronization with image-forming portions and convey the recording medium 24 so that the toner images formed in the respective image-forming portions are sequentially superimposed and transferred onto the recording medium 24. It is to be noted that the recording medium 24 is electrostatically adsorbed to the conveying belt 23 by the operation of an adsorption roller 30 provided right before the conveying belt 23, and is to be conveyed.

In the electrophotographic apparatus, the photosensitive drum 2 and the developing roller which is a conductive roller 1 of the present invention are placed so as to be in contact with each other, and rotate in the same direction at a position at which the photosensitive drum 2 is in contact with the developing roller. The electrophotographic apparatus is further provided with a fixing apparatus 31 for fixing the toner images which are superimposed and transferred onto the recording medium 24 by heating and the like, and a conveying apparatus (not illustrated) for discharging the image-formed recording medium to the outside of the apparatus. It is to be noted that the recording medium 24 is peeled from the conveying belt 23 by the operation of a peeling apparatus 32 and is to be sent to the fixing apparatus 31. On the other hand, the developing apparatus is provided with a cleaning member having a cleaning blade 33 for removing the transfer residual toner which is not transferred onto the photoreceptor 2 and remains, and a waste toner container 34 for storing the toner scraped off from the photoreceptor. The cleaned photosensitive drum 2 stands ready in the state of capable of forming an image.

Figure 3:
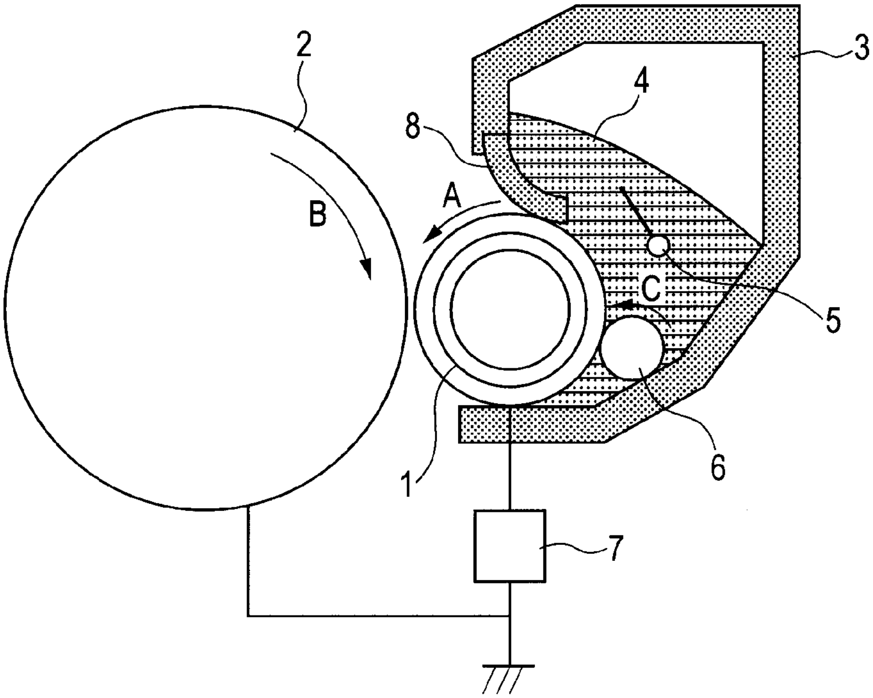
FIG. 3 is a schematic view of one example of a developing apparatus according to the present invention.

Next, FIG. 3 illustrates one example of a developing apparatus. In the developing apparatus, a photosensitive drum 2 as an electrostatic latent image support member for supporting an electrostatic latent image formed by any known process is rotated in the arrow B direction. A stirring blade 5 for stirring an one-component non-magnetic toner 4 is provided in a hopper 3 which is a toner container. The toner 4 is supplied to a developing roller which is the conductive roller 1 of the present invention, which a toner-supplying member 6 for peeling off the toner 4 existing on the surface of the developing roller after developing abuts. A supply roller which is the toner-supplying member rotates in the same direction (arrow C direction) as the direction (arrow A direction) of the developing roller, and thus the surface of a toner-supplying/peeling off roller moves in the direction counter to the surface of the developing roller. Therefore, an one-component non-magnetic toner having a non-magnetic toner supplied from the hopper 3 is supplied to the developing roller. A developing bias voltage is applied to the developing roller from a developing bias power source 7 in order to allow the one-component non-magnetic toner 4 having a non-magnetic toner supported on the developing roller to move.

The toner-supplying/peeling off member 6 can be an elastic roller member of resin, rubber, sponge or the like. Once the toner-supplying/peeling off member 6 peels off the toner, which is not developed and transferred to the photosensitive drum 2, from the surface of the developing roller, then generation of the unmoving toner on the developing roller is inhibited to thereby allow a toner to be uniformly charged.

As a member for regulating the layer thickness of the one-component non-magnetic toner 4 on the developing roller, a toner regulating member 8 made of a material having rubber elasticity, such as a urethane rubber or a silicone rubber, or a material having metal elasticity, such as phosphor bronze or stainless copper can be used. The toner regulating member 8 is brought into pressure-contact with the developing roller in the opposite direction to the rotational direction of the developing roller, thereby enabling forming a much thinner toner layer on the developing roller.

The process cartridge of the present invention can be provided with the electrophotographic member of the present invention as, for example, a charging roller, and can be configured to be attachable to and removable from the main body of the electrophotographic apparatus.

EXAMPLES

Hereinafter, the present invention will be described in more detail with reference to Examples.

[Shape of Conductive Roller]

In each Example, a conductive roller was produced so as to allow the shape of the conductive roller to be the following diameter of a cored bar and the following thickness of an elastic layer depending on each application. Herein, in the case where an elastic layer had a two-layer structure, the sum of the two layers was made to have the following thickness.

Developing roller: diameter of cored bar=6 mm, thickness of elastic layer=3.0 mm Charging roller: diameter of cored bar=6 mm, thickness of elastic layer=1.25 mm With respect to a second elastic layer and a surface layer, an elastic layer and a surface layer each having the described thickness were produced in both cases of the developing roller and the charging roller.

[Production of Elastic Roller]

First, the following elastic rollers each having a mandrel (cored bar) and an elastic layer were prepared.

Preparation of Elastic Roller 1-1

A conductive mandrel made of stainless steel (SUS304) was used for a cored bar. A silane coupling primer (trade name: DY35-051, Dow Corning Toray Co., Ltd.) was applied onto the periphery of the mandrel, and then baked at a temperature of 150° C. for 60 minutes.

Then, the mandrel was coaxially placed on the inside of a cylindrical mold, and the space between the inner periphery of the mold and the periphery of the mandrel was filled with a liquid material for forming an elastic layer, in which materials shown in the following Table 1 were dispersed, followed by heating at a temperature of 150° C. for 20 minutes. After cooling, the mandrel was released from the mold, and heated in an oven heated at a temperature of 200° C. for 5 hours, thereby providing a first elastic layer around the mandrel.

TABLE 1

| Material for forming first elastic layer | Parts by mass |
|---|---|
| Silicone rubber: XE15-645A liquid (trade name, Momentive Performance Materials Inc.) | 50 |
| Silicone rubber: XE15-645B liquid (trade name, Momentive Performance Materials Inc.) | 50 |
| Carbon black: HS-100 (trade name, Denki Kagaku Kogyo Kabushiki Kaisha) | 10 |

Then, a second elastic layer (resin layer) was provided on the periphery of the first elastic layer as follows. Namely, materials shown in Table 2 were added to methyl ethyl ketone (MEK) and well mixed, and the obtained mixture was charged into an overflow-type circulation coating apparatus. The mandrel provided with the first elastic layer was dipped in the circulation coating apparatus, pulled up and then air-dried for 30 minutes, and thereafter heated in an oven heated to a temperature of 150° C. for 5 hours to provide a second elastic layer having a thickness of 20 μm, thereby producing an elastic roller 1-1 having a mandrel and an elastic layer having a two-layer structure.

TABLE 2

| Material for forming second elastic layer | Parts by mass |
|---|---|
| Polyol: N5120 (trade name, Nippon Polyurethane Industry Co., Ltd.) | 87 |
| Isocyanate: L-55E (trade name, Nippon Polyurethane Industry Co., Ltd.) | 13 |
| Carbon black: MA77 (trade name, Mitsubishi Chemical Corporation) | 35 |
| Acrylic particle: G-400 transparent (trade name, Negami Chemical Industrial Co., Ltd.) | 10 |

Preparation of Elastic Rollers 1-2 to 1-6

Elastic rollers 1-2 to 1-6 were prepared in the same manner as the elastic roller 1-1 except that the amounts of the carbon black were changed to 12 parts by mass, 15 parts by mass, 8 parts by mass, 18 parts by mass, and 13 parts by mass in Table 1.

Preparation of Elastic Roller 2-1

A silane coupling primer: DY35-051 (trade name, Dow Corning Toray Co., Ltd.) was applied to a mandrel made of stainless steel: SUS304, and then baked at a temperature of 150° C. for minutes. Then, a rubber mixture obtained by well kneading materials shown in the following Table 3 was provided on the mandrel by a crosshead extruder, and heated at a temperature of 170° C. for 20 minutes, thereby preparing an elastic roller 2-1.

TABLE 3

| Material for forming first elastic layer | Parts by mass |
|---|---|
| Silicone rubber: TSE270-5U (trade name, Momentive Performance Materials Inc.) | 92 |
| Crosslinking agent: TC-8 (trade name, Momentive Performance Materials Inc.) | 8 |
| Carbon black: Denka Black (trade name, Denki Kagaku Kogyo Kabushiki Kaisha) | 10 |

Preparation of Elastic Rollers 2-2 to 2-3

Elastic rollers 2-2 to 2-3 were prepared in the same manner as in the elastic roller 2-1 except that the amounts of the carbon black compounded were changed to 15 parts by mass and 50 parts by mass in Table 3.

Preparation of Elastic Roller 3-1

A primer: Metaloc U-20 (trade name, Toyokagaku Kenkyusho Co., Ltd.) was applied to a mandrel made of stainless steel: SUS304, dried at a temperature of 80° C. for 30 minutes, and then further heated at 120° C. for 60 minutes. Then, a rubber mixture obtained by well kneading materials shown in the following Table 4 was provided on the mandrel by a crosshead extruder, and heated at a temperature of 150° C. for 50 minutes, thereby preparing an elastic roller 3-1.

TABLE 4

| Material for forming first elastic layer | Parts by mass |
|---|---|
| Acrylonitrile butadiene rubber: JSR N231L (trade name, JSR Corporation) | 100 |
| Zinc oxide: two kinds of zinc oxides (HakusuiTech Co., Ltd.) | 5 |
| Stearic acid: Stearic acid S (trade name, Kao Corporation) | 2 |
| Sulfur: dispersible sulfur: Sulfax 200S (trade name, produced by Tsuruimi chemical Industry Co., Ltd.) | 1.2 |
| Di-2-benzothiazolyl tetrasulfide: Nocceler DM (trade name, Ouchi Shinko Chemical Industrial Co., Ltd.) | 1.0 |
| Dipentamethylene thiuram tetrasulfide: Nocceler TRA (trade name, Ouchi Shinko Chemical Industrial Co., Ltd.) | 1.0 |
| Tetramethyl thiuram monosulfide: Nocceler TS (trade name, Ouchi Shinko Chemical Industrial Co., Ltd.) | 1.0 |
| Plasticizer: Polycizer W-1600 (trade name, DIC Corporation) | 50 |
| Carbon black: Toka Black #7360SB (trade name, Tokai Carbon Co., Ltd.) | 40 |

Preparation of Elastic Rollers 3-2 to 3-3

Elastic rollers 3-2 to 3-3 were prepared in the same manner as in the elastic roller 3-1 except that the amounts of the carbon black compounded were changed to 30 parts by mass and 50 parts by mass in Table 4.

Preparation of Elastic Roller 4-1

A primer: Metaloc U-20 (trade name, Toyokagaku Kenkyusho Co., Ltd.) was applied to a mandrel made of stainless steel: SUS304, dried at a temperature of 80° C. for 30 minutes, and then further heated at 120° C. for 60 minutes. Then, a rubber mixture obtained by well kneading materials shown in the following Table 5 was provided on the mandrel by a crosshead extruder, and heated at a temperature of 140° C. for 60 minutes, thereby preparing an elastic roller 4-1.

TABLE 5

| Material for forming first elastic layer | Parts by mass |
|---|---|
| Epichlorohydrin-ethylene oxide-allyl glycidyl ether terpolymer: Epichlomer CG (trade name, Daiso Co., Ltd.) | 100 |
| Stearic acid: Stearic acid S (trade name, produced by Kao Corporation) | 2 |
| Calcium carbonate: Nanox #30 (trade name, Maruo Calcium Co., Ltd.) | 45 |
| Carbon black: Toka Black #7360SB (trade name, Tokai Carbon Co., Ltd.) | 5 |
| Sulfur: dispersible sulfur: Sulfax 200S (trade name, produced by Tsuruimi Chemical Industry Co., Ltd.) | 1.2 |
| Di-2-benzothiazolyl tetrasulfide: Nocceler DM (trade name, Ouchi Shinko Chemical Industrial Co., Ltd.) | 1.0 |
| Dipentamethylene thiuram tetrasulfide: Nocceler TRA (trade name, Ouchi Shinko Chemical Industrial Co., Ltd.) | 1.0 |

Preparation of Elastic Rollers 4-2 to 4-3

Elastic rollers 4-2 to 4-3 were prepared in the same manner as in the elastic roller 4-1 except that the amounts of the carbon black compounded were changed to 8 parts by mass and 1 part by mass in Table 5.

Preparation of Elastic Roller 5

A second elastic layer was provided on the periphery of the elastic roller 2-1 as follows. Namely, materials shown in Table 6 were weighed and methyl isobutyl ketone (MIBK) was added thereto, and the well-stirred mixture was charged into an overflow-type circulation coating apparatus. The elastic roller 2 was dipped in the coating apparatus, pulled up and then heated at a temperature of 80° C. for 1 hour, and thereafter further heated at a temperature of 160° C. for 1 hour to provide a second elastic layer having a thickness of 20 μm, thereby producing an elastic roller 5.

TABLE 6

| Material for forming second elastic layer | Parts by mass |
|---|---|
| Acrylic polyol: Placcel DC2016 (trade name, Daicel Corporation) | 55.5 |
| Isocyanate 1: Duranate TPA-B80E (trade name, Asahi Kasei Corporation) | 31.2 |
| Isocyanate 2: Vestanat B1370 (trade name, Degussa-Huls AG) | 13.3 |
| Titanium oxide: MTY02 (trade name, Tayca Corporation) | 11.1 |
| Carbon black: MA11 (trade name, Mitsubishi Chemical Corporation) | 25.0 |
| Dimethylsilicone oil: SH28PA (trade name, Dow Corning Toray Co., Ltd.) | 0.04 |
| Polymethylmethacrylate resin particle: C-12 (trade name, Toyobo Co., Ltd.) | 5.5 |

(Elastic Roller 6)

The second elastic layer according to the elastic roller 5 was provided on the periphery of the elastic roller 3-1. This is referred to as an elastic roller 6.

(Elastic Roller 7)

The second elastic layer according to the elastic roller 5 was provided on the periphery of the elastic roller 4-1. This is referred to as an elastic roller 7.

Example 1

Preparation of Electrophotographic Roller 1-1

According to the following method, a surface layer was formed on the periphery of the elastic layer of the prepared elastic roller 1-1 as described above. Namely, the elastic roller 1-1 was set in a CVD apparatus illustrated in FIG. 4, and the inside of a chamber was evacuated until reaching 2 Pa by a vacuum pump. Then, while gasified titanium tetraisopropoxide was introduced into the chamber at a flow rate of 5 $cm^3$/sec and the elastic roller 1-1 was rotated at a rotation number of 20 rpm, a 70 W of power at a frequency of 13.56 MHz was supplied between plate electrodes by a high-frequency power source to generate plasma between the electrodes. Such a state was maintained for 120 seconds to thereby produce a surface layer having a thickness of 100 nm on the periphery of the elastic roller 1-1. Thus, an electrophotographic roller 1-1 was prepared.

Examples 1-2 to 1-3

Preparation of Electrophotographic Rollers 1-2 to 1-3

Electrophotographic rollers 1-2 to 1-3 were prepared in the same manner as in the electrophotographic roller 1-1 except that the elastic roller 1-1 was changed to the elastic roller 1-2 or the elastic roller 1-3.

[Evaluation (1): Confirmation of Presence of Chemical Bonds Represented by Formula 1 and Formula 2]

The surface layer of each of the electrophotographic rollers 1-1 to 1-3 according to Example 1 was analyzed by using a scanning X-ray photoelectron spectrometer (trade name: PHI 5000 VersaProbe, ULVAC-PHI, Incorporated), and the presences of an O—Ti—O bond and a Ti—O—C bond were confirmed.

[Evaluation (2): Evaluation of Oxygen-Carbon Atom Ratio $C_{C—C}/O_{C—O}$]

With respect to the surface layer of each of the electrophotographic rollers 1-1 to 1-3 according to Example 1, the abundance ratio ($C_{C—C}$) of a carbon atom bound to a carbon atom and the abundance ratio ($O_{C—O}$) of an oxygen atom bound to a carbon atom were measured in terms of amount by using a scanning X-ray photoelectron spectrometer (trade name: PHI 5000 VersaProbe, ULVAC-PHI, Incorporated) to determine the proportion ($C_{C—C}/O_{C—O}$).

[Evaluation (3): Surface Resistance of Titanium Oxide Film Forming Surface Layer]

A titanium oxide film was formed on a polyester film by using the same method as in the surface layer according to Example 1, and the surface resistance of the titanium oxide film was measured by using an ultrahigh resistance/microammeter (trade name: R8340, Advantest Corporation) when an applied voltage was 300 V.

[Evaluation (4): Evaluation of Surface Potential]

With respect to each of the electrophotographic rollers 1-1 to 1-3 according to Example 1, surface potentials were measured in respective points obtained by dividing each roller into 260 in the longitudinal direction and into 18 in the circumferential direction. The arithmetic mean value of the surface potentials at all points measured was defined as the surface potential of each electrophotographic roller, Vp.

Then, the surface of each electrophotographic roller after Vp had been measured was cut out by a polishing machine by a thickness of 10 μm in the depth direction from the surface. The surface potentials of each electrophotographic roller after polishing were measured to calculate the mean value, as described above, thereby obtaining the surface potential, Ve, of each electrophotographic roller after polishing. The Vp/Ve was determined from the surface potentials Vp and Ve. Herein, the surface potentials were measured by using a dielectric relaxation analysis system manufactured by Quality Engineering Associates, Inc.

[Evaluation (5): Evaluation for Use as Developing Roller (I)]

<Evaluation (5)-1>: Evaluation of Ghost Performance

Each of the electrophotographic rollers 1-1 to 1-3 according to Example 1 was mounted as a developing roller to a process cartridge for a color laser printer (trade name: LBP7700C (altered machine), manufactured by Canon Inc.). The process cartridge was loaded to the color laser printer, and 20,000 sheets of electrophotographic images were output under an environment of a temperature of 30° C. and a relative humidity of 80% and under an environment of a temperature 15° C. and a relative humidity of 10%. The electrophotographic images were images in which 4-point size letters of alphabet “E” were printed on an A4-size sheet so that the printing percentage was 1%. Subsequently, the following image was output.

Image for Evaluating Ghost Performance

A total of 2 sheets each having a different image pattern from each other were used, in which each image pattern had six solid images having a square of 20 mm on a side and arranged next to each other on the upper portion of a sheet of paper as well as a halftone pattern located below the upper portion over the whole area, and one image pattern had a halftone density different from a halftone density of the other image pattern. Herein, one halftone used had a density of 0.4 and the other had a density of 0.7 as measured by a spectral densitometer: X-Rite 504 (trade name, S.D.G K.K.).

The obtained images were visually observed and evaluated according to the criteria in the following Table 7.

TABLE 7

| Rank | Criteria |
|---|---|
| A | No uneven density in a square of 20 mm on a side was observable on halftones of both image patterns. |
| B | Uneven density in a square of 20 mm on a side was slightly observable on a halftone of one image pattern. |
| C | Uneven density in a square of 20 mm on a side was slightly observable on halftones of both image patterns. |

<Evaluation (5)-2>: Filming Evaluation

The electrophotographic roller which had been used as the developing roller was taken out from the process cartridge, and the surface of the electrophotographic roller was observed by an optical microscope and evaluated according to the criteria described in the following Table 8.

TABLE 8

| Rank | Criteria |
|---|---|
| A | No toner was adhered. |
| B | Toner was slightly fixed. |
| C | Toner was considerably fixed. |

[Evaluation (6): Evaluation for Use as Developing Roller (II)]

<Evaluation (6)-1>

Each of the electrophotographic rollers 1-1 to 1-3 according to Example 1 was mounted as a developing roller to a process cartridge for a color laser printer (trade name: LBP7700C (altered machine), manufactured by Canon Inc.). The process cartridge was loaded to the color laser printer, and 20,000 sheets of electrophotographic images were output under an environment of a temperature of 30° C. and a relative humidity of 80%. The electrophotographic images were images in which 4-point size letters of alphabet “E” were printed on an A4-size sheet so that the printing percentage was 1%. Subsequently, a solid white image was output, and then a reflection density was measured by a white photometer TC-60DS/A (trade name, Tokyo Denshoku Co., Ltd.). Herein, the difference between reflection densities of a not-printed area before and after printing was defined as fogging (%) and evaluated according to the criteria described in the following Table 9.

TABLE 9

| Rank | Criteria |
|---|---|
| A | Fogging was less than 1.0%. |
| B | Fogging was 1.0% or more and 3.0% or less. |
| C | Fogging was more than 3.0%. |

<Evaluation (6)-2>

After the solid white image subjected to the evaluation of Evaluation (6)-1 was output, the electrophotographic roller which had been used as the developing roller was taken out from the process cartridge, and the presence and degree of scraping on the surface were observed by an optical microscope and evaluated according to the criteria described in the following Table 10.

TABLE 10

| Rank | Criteria |
|---|---|
| A | No scraping was observed on the surface. |
| B | Scraping was slightly observed on the surface. |
| C | Scraping was observed on the surface. |
| D | Scraping was remarkably observed on the surface. |

Example 2

Preparation of Electrophotographic Rollers 2-1 to 2-3

Electrophotographic rollers 2-1 to 2-3 were prepared in the same manner as in the electrophotographic rollers 1-1 to 1-3 according to Example 1 except that titanium tetra-n-butoxide was used as a raw material gas, and subjected to Evaluations (1) to (6).

Example 3

Preparation of Electrophotographic Rollers 3-1 to 3-3

Electrophotographic rollers 3-1 to 3-3 were prepared in the same manner as in the electrophotographic rollers 1-1 to 1-3 according to Example 1 except that a mixture of titanium tetra-n-butoxide and titanium tetra-2-ethyl hexoxide (=1/1, in molar ratio of Ti atoms) was used as a raw material gas, and subjected to Evaluations (1) to (6).

Example 4

Electrophotographic rollers 4-1 to 4-3 were prepared in the same manner as in the electrophotographic rollers 1-1 to 1-3 according to Example 1 except that titanium tetra-2-ethyl hexoxide was used as a raw material gas, and subjected to Evaluations (1) to (6).

Example 5

Electrophotographic rollers 5-1 to 5-3 were prepared in the same manner as in the electrophotographic rollers 1-1 to 1-3 according to Example 1 except that titanium tetraethoxide was used as a raw material gas, and subjected to Evaluations (1) to (6).

Example 6

Preparation of Electrophotographic Rollers 6-1 to 6-2

Electrophotographic rollers 6-1 to 6-2 were prepared in the same manner as in the electrophotographic roller 1-1 according to Example 1 except that the elastic rollers 1-4 and 1-5 were used, and subjected to Evaluations (1) to (6).

Example 7

Preparation of Electrophotographic Rollers 7-1 to 7-2

Electrophotographic rollers 7-1 to 7-2 were prepared in the same manner as in the electrophotographic rollers 6-1 to 6-2 according to Example 6 except that a mixture of titanium tetra-n-butoxide and titanium tetra-2-ethyl hexoxide (=1/1, in molar ratio of Ti atoms) was used as a raw material gas, and subjected to Evaluations (1) to (6).

Example 8

Preparation of Electrophotographic Rollers 8-1 to 8-2

Electrophotographic rollers 8-1 to 8-2 were prepared in the same manner as in the electrophotographic rollers 6-1 to 6-2 according to Example 6 except that titanium tetra-2-ethyl hexoxide was used as a raw material gas, and subjected to Evaluations (1) to (6).

Example 10

Preparation of Electrophotographic Rollers 10-1 to 10-3

Electrophotographic rollers 10-1 to 10-3 were prepared in the same manner as in the electrophotographic roller 1-1 according to Example 1 except that the elastic rollers 2-1, 4-1 and 3-1 were used, and subjected to Evaluations (1) to (6).

Example 11

Preparation of Electrophotographic Roller 11

An electrophotographic roller 11 was prepared in the same manner as in the electrophotographic roller 2-1 according to Example 2 except that the elastic roller 3-2 was used, and subjected to Evaluations (1) to (6).

Example 12

Preparation of Electrophotographic Rollers 12-1 to 12-2

Electrophotographic rollers 12-1 to 12-2 were prepared in the same manner as in the electrophotographic roller 3-1 according to Example 3 except that the elastic rollers 4-2 and 2-2 were used, and subjected to Evaluations (1) to (6).

Example 14

Preparation of Electrophotographic Roller 14

An electrophotographic roller 14 was prepared in the same manner as in the electrophotographic roller 4-1 according to Example 4 except that the elastic roller 3-1 was used, and subjected to Evaluations (1) to (6).

Example 16

Preparation of Electrophotographic Rollers 16-1 to 16-2

Electrophotographic rollers 16-1 to 16-2 were prepared in the same manner as in the electrophotographic roller 4-1 according to Example 4 except that the elastic rollers 2-2 and 4-3 were used, and subjected to Evaluations (1) to (6).

Example 17

Preparation of Electrophotographic Roller 17

Electrophotographic rollers 17-1 to 17-2 were prepared in the same manner as in the electrophotographic roller 5-1 according to Example 5 except that the elastic roller 2-3 was used, and subjected to Evaluations (1) to (6).

Example 18

Preparation of Electrophotographic Rollers 18-1 to 18-2

Electrophotographic rollers 18-1 to 18-2 were prepared in the same manner as in the electrophotographic roller 3-1 according to Example 3 except that the elastic rollers 3-3 and 4-3 were used, and subjected to Evaluations (1) to (6).

Example 9

Preparation of Electrophotographic Roller 9-1

20 parts of by mass of isopropanol and 500 parts by mass of water were added based on 100 parts by mass of a mixture of titanium tetraisopropoxide and titanium tetra-octadecyloxide (=1/1, in molar ratio of Ti atoms), and heated and mixed at 150° C. for 2 hours. After cooling, the solution was charged into a dipping apparatus, the elastic roller 1-1 was dipped in the apparatus, pulled up, then air-dried for 60 minutes, and thereafter heated at a temperature of 180° C. for 5 hours, thereby producing a surface layer having a thickness of 100 nm. An electrophotographic roller 9-1 was thus prepared and subjected to Evaluations (1) to (6).

Preparation of Electrophotographic Roller 9-2

An electrophotographic roller 9-2 was prepared in the same manner as in the electrophotographic roller 9-1 except that the elastic roller 1-5 was used, and subjected to Evaluations (1) to (6).

Example 13

Preparation of Electrophotographic Roller 13

An electrophotographic roller 13 was prepared in the same manner as in the electrophotographic roller 9-1 except that the mixture of titanium tetraisopropoxide and titanium tetra-octadecyloxide (=1/1) was changed to a mixture of titanium tetra-n-butoxide and titanium tetra-2-ethyl hexoxide (=1/1, in molar ratio of Ti atoms), and subjected to Evaluations (1) to (6).

Example 15

Preparation of Electrophotographic Roller 15

An electrophotographic roller 15 was prepared in the same manner as in the electrophotographic roller 9-1 except that the elastic roller 1-6 was used and the mixture of titanium tetraisopropoxide and titanium tetra-octadecyloxide (=1/1) was changed to titanium tetra-2-ethyl hexoxide, and subjected to Evaluations (1) to (6).

Comparative Example 1

Preparation of Electrophotographic Roller C-1

The elastic roller 1-1 was prepared as an electrophotographic roller C-1 according to Comparative Example 1, and subjected to Evaluations (5) to (6).

Comparative Example 2

Preparation of Electrophotographic Roller C-2

The elastic roller 2-1 was prepared as an electrophotographic roller C-2 according to Comparative Example 2, and subjected to Evaluations (5) to (6).

Comparative Example 3

Preparation of Electrophotographic Roller C-3

The elastic roller 3-1 was prepared as an electrophotographic roller C-3 according to Comparative Example 3, and subjected to Evaluations (5) to (6).

Comparative Example 4

Preparation of Electrophotographic Roller C-4

The elastic roller 4-1 was prepared as an electrophotographic roller C-4 according to Comparative Example 4, and subjected to Evaluations (5) to (6).

Comparative Example 5

Preparation of Electrophotographic Roller C-5

After titanium oxide powders (trade name: R-820, Ishihara Sangyo Kaisha, Ltd.) were sprinkled while rotating the elastic roller 1-1 in the circumferential direction, excessive titanium oxide powders were removed by an air gun to thereby prepare an electrophotographic roller C-5 in which the titanium oxide powders were supported on the surface of the elastic roller, and the electrophotographic roller C-5 was subjected to Evaluations (1) and (5) to (6).

Comparative Example 6

Preparation of Electrophotographic Roller C-6

A surface layer containing a titanium oxide film was formed on the surface of the elastic roller 1-1 by sputtering to thereby prepare an electrophotographic roller C-6, which was subjected to Evaluations (1), (5) and (6).

Comparative Example 7

Preparation of Electrophotographic Roller C-7

The elastic roller 1-1 was set in a CVD apparatus illustrated in FIG. 4, and the inside of a chamber was evacuated until reaching 2 Pa by a vacuum pump. Then, while tetramethyldisiloxane and oxygen were introduced into the chamber at a flow rate of 20 $cm^3$/sec and at a flow rate of 100 $cm^3$/sec, respectively, and the elastic roller 1-1 was rotated at a rotation number of 20 rpm, a 200 W of power at a frequency of 13.56 MHz was supplied between plate electrodes by a high-frequency power source to generate plasma between the electrodes. Such a state was maintained for 120 seconds to thereby form a surface layer containing a silica film on the periphery of the elastic roller 1-1. An electrophotographic roller C-7 was thus obtained. The electrophotographic roller C-7 was subjected to Evaluations (1) and (3) to (6).

With respect to Examples 1 to 18 described above, the evaluation results are shown in Table 11-1 and Table 11-2. In addition, the results of Comparative Examples 1 to 7 are shown in Table 12.

TABLE 11-1

| | | Electro-photographic Roller No. | Evaluations | | | | | | | | |
|---|---|---|---|---|---|---|---|---|---|---|---|
| | | | (1) | | | | | | | | |
| | | | Presence of structural unit according to formula (1) | Presence of structural unit according to formula (2) | (2) Cc-c/Oc-o | (3) Surface resistance (Ω/□) | (4) Vp/Ve | (5)-1 Ghost | (5)-2 Filming | (6)-1 Fogging | (6)-2 Scraping resistance of surface |
| Examples | 1 | 1-1 | Yes | Yes | 3 | $8.0 \times 10^7$ | 0.1 | A | A | A | A |
| | | 1-2 | Yes | Yes | | | 5 | A | A | A | A |
| | | 1-3 | Yes | Yes | | | 10 | A | A | A | A |
| | 2 | 2-1 | Yes | Yes | 4 | $2.2 \times 10^7$ | 0.1 | A | A | A | A |
| | | 2-2 | Yes | Yes | | | 5 | A | A | A | A |
| | | 2-3 | Yes | Yes | | | 10 | A | A | A | A |
| | 3 | 3-1 | Yes | Yes | 6 | $1.3 \times 10^8$ | 0.1 | A | A | A | A |
| | | 3-2 | Yes | Yes | | | 5 | A | A | A | A |
| | | 3-3 | Yes | Yes | | | 10 | A | A | A | A |
| | 4 | 4-1 | Yes | Yes | 8 | $4.5 \times 10^7$ | 0.1 | A | A | A | B |
| | | 4-2 | Yes | Yes | | | 5 | A | A | A | B |
| | | 4-3 | Yes | Yes | | | 10 | A | A | A | B |
| | 5 | 5-1 | Yes | Yes | 2 | $5.9 \times 10^7$ | 0.1 | A | B | A | A |
| | | 5-2 | Yes | Yes | | | 5 | A | B | A | A |
| | | 5-3 | Yes | Yes | | | 10 | A | B | A | A |
| | 6 | 6-1 | Yes | Yes | 3 | $8.0 \times 10^7$ | 0.1 | A | A | B | A |
| | | 6-2 | Yes | Yes | | | 11 | B | A | A | A |
| | 7 | 7-1 | Yes | Yes | 6 | $1.3 \times 10^8$ | 0.1 | A | A | B | A |
| | | 7-2 | Yes | Yes | | | 11 | B | A | A | A |
| | 8 | 8-1 | Yes | Yes | 8 | $4.5 \times 10^7$ | 0.05 | A | A | B | A |
| | | 8-2 | Yes | Yes | | | 11 | B | A | A | A |
| | 9 | 9-1 | Yes | Yes | 2 | $7.4 \times 10^8$ | 0.1 | A | A | A | C |
| | | 9-2 | Yes | Yes | | | 10 | A | A | A | C |
| | 10 | 10-1 | Yes | Yes | 3 | $8.0 \times 10^7$ | 0.1 | A | A | A | A |
| | | 10-2 | Yes | Yes | | | 5 | A | A | A | A |
| | | 10-3 | Yes | Yes | | | 10 | A | A | A | A |

TABLE 11-2

| | | Electro-photographic Roller No. | Evaluations | | | | | | | | |
|---|---|---|---|---|---|---|---|---|---|---|---|
| | | | (1) | | | | | | | | |
| | | | Presence of structural unit according to formula (1) | Presence of structural unit according to formula (2) | (2) Cc-c/Oc-o | (3) Surface resistance (Ω/□) | (4) Vp/Ve | (5)-1 Ghost | (5)-2 Filming | (6)-1 Fogging | (6)-2 Scraping resistance of surface |
| Examples | 11 | 11 | Yes | Yes | 4 | $2.2 \times 10^7$ | 5 | A | A | A | A |
| | 12 | 12-1 | Yes | Yes | 6 | $1.3 \times 10^8$ | 10 | A | A | A | A |
| | | 12-2 | Yes | Yes | | | 5 | A | A | A | A |
| | 13 | 13 | Yes | Yes | 6 | $8.0 \times 10^9$ | 0.1 | A | A | A | A |
| | 14 | 14 | Yes | Yes | 8 | $4.5 \times 10^7$ | 10 | A | A | A | B |
| | 15 | 15 | Yes | Yes | | $2.8 \times 10^9$ | 7 | A | A | A | B |
| | 16 | 16-1 | Yes | Yes | 8 | $4.5 \times 10^7$ | 5 | A | A | A | B |
| | | 16-2 | Yes | Yes | | | 0.1 | A | A | A | B |
| | 17 | 17 | Yes | Yes | 2 | $5.9 \times 10^7$ | 5 | A | B | A | A |
| | 18 | 18-1 | Yes | Yes | 6 | $1.3 \times 10^8$ | 11 | B | A | A | A |
| | | 18-2 | Yes | Yes | | | 0.1 | A | A | B | A |

TABLE 12

| | | Electro-photographic Roller No. | Evaluations | | | | | | | | |
|---|---|---|---|---|---|---|---|---|---|---|---|
| | | | (1) | | | | | | | | |
| | | | Presence of structural unit according to formula (1) | Presence of structural unit according to formula (2) | (2) Cc-c/Oc-o | (3) Surface resistance (Ω/□) | (4) Vp/Ve | (5)-1 Ghost | (5)-2 Filming | (6)-1 Fogging | (6)-2 Scraping resistance of surface |
| Comparative Examples | 1 | C-1 | No | No | — | — | — | A | A | B | D |
| | 2 | C-2 | No | No | — | — | — | A | A | C | D |

TABLE 12-continued

| | Electro-photographic Roller No. | Evaluations (1) Presence of structural unit according to formula (1) | Presence of structural unit according to formula (2) | (2) Cc-c/Oc-o | (3) Surface resistance (Ω/□) | (4) Vp/Ve | (5)-1 Ghost | (5)-2 Filming | (6)-1 Fogging | (6)-2 Scraping resistance of surface |
|---|---|---|---|---|---|---|---|---|---|---|
| 3 | C-3 | No | No | — | — | — | A | A | C | D |
| 4 | C-4 | No | No | — | — | — | A | A | C | D |
| 5 | C-5 | Yes | No | — | — | — | A | B | B | D |
| 6 | C-6 | Yes | No | — | — | — | B | C | B | A |
| 7 | C-7 | No | No | — | $3.0 \times 10^{15}$ | 30 | C | A | A | A |

The electrophotographic rollers prepared in Examples 1 to 18 have the titanium oxide film in which the surface layer contains both chemical bonds represented by the formula (1) and the formula (2).

The titanium oxide film containing the bond represented by the formula (2) has a smaller number of bonds between atoms than the titanium oxide film containing only the chemical bond represented by the formula (1), and thus is a flexible film. Therefore, even in the case where the electrophotographic roller according to each Example was used as the developing roller, a toner was fixed to the surface with difficulty, and generation of the filming was suppressed.

In addition, even in the case where the electrophotographic roller according to each Example was used as the developing roller, no scraping of the surface layer was observed, and ghost performance and fogging performance were favorable because the surface layer was conductive.

On the other hand, the electrophotographic rollers C-1 to C-4 according to Comparative Examples 1 to 4 were relatively inferior in durability because the surfaces were made of the resin or rubber derived from the elastic layer, and in the case where the electrophotographic rollers were used as the developing roller, scraping was observed on the surfaces due to rubbing friction with a photosensitive drum and a developer regulating member.

When the electrophotographic roller C-5 according to Comparative Example 5, in which the titanium oxide powders were adhered on the surface, was used as the developing roller, the titanium oxide powders were peeled off from the surface of the elastic layer and the surface of the elastic layer was exposed, resulting in scraping observed on the surface. Furthermore, since no smoothness was on the surface, a toner likely remained on the surface of the developing roller to thereby likely allow the toner to be fixed, and filming was observed.

Since the electrophotographic roller according to Comparative Example 6, having a surface layer containing a titanium oxide film having no chemical bond represented by the formula (2) as the surface layer, had a hard surface layer, filming of a toner was generated.

Since the electrophotographic roller C-7 according to Comparative Example 7, having a surface layer containing a silica film, had an insulating surface layer, the surface potential was high and a ghost image was observed in the electrophotographic image.

As described above, even when the electrophotographic roller according to the present invention is used as the developing roller for a long period of time, the surface layer is hardly scraped. In addition, since the titanium oxide film according to the present invention has conductivity, a ghost image is hardly generated. In addition, since the titanium oxide film according to the present invention is more flexible than the titanium oxide film containing only the chemical bond represented by the formula (1), the titanium oxide film according to the present invention causes deterioration of a toner with difficulty and is conducive to stably forming a high quality electrophotographic image for a long period.

Example 19

The same electrophotographic roller as the electrophotographic roller 10-1 according to Example 10 was prepared, and defined as an electrophotographic roller 19 according to the present Example. The electrophotographic roller 19 had the same results of Evaluations (1) to (4) as the results for the electrophotographic roller 10-1, and thus was not subjected to Evaluations (1) to (4) but was subjected to the following Evaluation (7).

<Evaluation (7)>

The electrophotographic roller 19 was mounted as a charging roller to a process cartridge for a color laser printer (trade name: LBP7700C (altered machine), manufactured by Canon Inc.). The process cartridge was loaded to the color laser printer. The laser printer was used to output 20,000 sheets of electrophotographic images under an environment of a temperature of 15° C. and a relative humidity of 10%. The electrophotographic images were images in which 4-point size letters of alphabet "E" were printed on an A4-size sheet so that the printing percentage was 1%. Subsequently, two halftone images, one having a density different from a density of the other, were each output one by one. Herein, one halftone used had a density of 0.4 and the other had a density of 0.7 as measured by a spectral densitometer: X-Rite 504 (trade name, S.D.G K.K.).

The process cartridge was taken out from the electrophotographic apparatus after forming the halftone image, the electrophotographic roller 19 was taken out from the process cartridge, and the surface was observed by an optical microscope at a magnification of 500 times in 20 points. Then, the presence of an adhered substance observed and the size of the adhered substance were evaluated according to the criteria described in the following Table 13.

TABLE 13

| Rank | Criteria |
|---|---|
| A | No adhered substance having a size of 10 μm or more was observed. |
| B | No adhered substance having a size of 50 μm or more was observed, but an adhered substance having a size of 10 μm or more and less than 50 μm was observed. |

TABLE 13-continued

| Rank | Criteria |
|---|---|
| C | An adhered substance having a size of 50 μm or more was observed. |

The presence of a stripe due to uneven charging of the charging roller was visually observed for the two sheets of halftone images obtained as described above, and evaluated according to the criteria described in the following Table 14.

TABLE 14

| Rank | Criteria |
|---|---|
| A | No stripe was observed for both the two halftone images. |
| B | A stripe was observed for one of the two halftone images. |
| C | A stripe was observed for both the two halftone images. |

Example 20

An electrophotographic roller 20 was prepared in the same manner as in the electrophotographic roller 9-1 according to Example 9 except that the elastic roller 3-1 was used and titanium tetraethoxide was used as a raw material gas, and subjected to Evaluations (1) to (4) and Evaluation (7).

Example 21

An electrophotographic roller 21 was prepared in the same manner as in the electrophotographic roller 1-1 according to Example 1 except that the elastic roller 4-1 was used and titanium tetra-n-propoxide was used as a raw material gas, and subjected to Evaluations (1) to (4) and (7).

Example 22

An electrophotographic roller 22 was prepared in the same manner as in the electrophotographic roller 9-1 according to Example 9 except that the elastic roller 5 was used and titanium tetra-n-propoxide was used as a raw material gas, and subjected to Evaluations (1) to (4) and (7).

Example 23

An electrophotographic roller 23 was prepared in the same manner as in the electrophotographic roller 19 according to Example 19 except that the elastic roller 6 was used, and subjected to Evaluations (1) to (4) and (7).

Example 24

An electrophotographic roller 24 was prepared in the same manner as in the electrophotographic roller 20 according to Example 20 except that the elastic roller 7 was used, and subjected to Evaluations (1) to (4) and (7).

Comparative Example 8

A surface layer containing a titanium oxide film was formed on the periphery of the elastic roller 2-1 by sputtering to thereby prepare an electrophotographic roller C-8, which was subjected to Evaluations (1) and (7).

Comparative Example 9

An electrophotographic roller C-9 was prepared in the same manner as in the electrophotographic roller C-7 according to Comparative Example 7 except that the elastic roller 7 was used, and subjected to Evaluations (1), (3), (4) and (7).

The evaluation results of Examples 19 to 24 and Comparative Examples 8 to 9 described above are shown in Table 15.

TABLE 15

| | | | Evaluations | | | | | | |
|---|---|---|---|---|---|---|---|---|---|
| | | | (1) | | | | | (7) | |
| | | Electrophotographic Roller No. | Presence of structural unit according to formula (1) | Presence of structural unit according to formula (2) | (2) Cc-c/Oc-o | (3) Surface resistance (Ω/□) | (4) Vp/Ve | Adhered substance | Stripe due to uneven charging |
| Examples | 19 | 19 | Yes | Yes | 3 | $8.0 \times 10^{7}$ | 0.1 | A | A |
| | 20 | 20 | Yes | Yes | 4 | $8.4 \times 10^{9}$ | 5 | B | A |
| | 21 | 21 | Yes | Yes | 3 | $2.2 \times 10^{7}$ | 10 | A | A |
| | 22 | 22 | Yes | Yes | 4 | $6.2 \times 10^{9}$ | 0.1 | A | A |
| | 23 | 23 | Yes | Yes | 3 | $8.0 \times 10^{7}$ | 5 | A | A |
| | 24 | 24 | Yes | Yes | 4 | $5.9 \times 10^{7}$ | 10 | B | A |
| Comparative | 8 | C-8 | Yes | No | — | — | — | C | B |
| Examples | 9 | C-9 | No | No | — | $3.0 \times 10^{15}$ | 30 | B | C |

In the case where the electrophotographic roller according to the present invention is used as the charging roller, the surface layer contains the alkoxy-modified titanium oxide film to thereby suppress adhesion of foreign substances on the surface of the charging roller. Therefore, generation of uneven charging on the electrophotographic photoreceptor due to the charging roller could be suppressed, and as a result, generation of the stripe on the electrophotographic image due to the uneven charging could be suppressed.

On the other hand, the electrophotographic roller C-8 according to Comparative Example 8, having a surface layer containing a titanium oxide film having no chemical bond represented by the formula (2) as the surface layer, had a high elastic modulus to thereby have a higher contact pressure with the photosensitive drum and thus was likely adhered to an external additive for a toner, and an adhered substance having a size of 50 μm or more was observed on the surface of the charging roller.

The electrophotographic roller C-9 according to Comparative Example 9, having a surface layer containing a silica film, had a high surface potential, and thus an external additive for a toner was electrostatically adhered on the surface. In addition, uneven adhesion and a high surface potential were combined with each other to generate uneven surface potential in the circumferential direction of the charging roller and to generate uneven charging in the electrophotographic photoreceptor, resulting in generating the stripe due to the uneven charging in the electrophotographic image.

From the foregoing, it has been found that in the case where the electrophotographic roller according to the present invention is used as the charging roller, adhesion of foreign substances on the surface of the charging roller and the stripe due to the uneven charging can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-133744, filed Jun. 15, 2011, which is hereby incorporated by reference herein in its entirety.

What is claimed is:

1. An electrophotographic member comprising:

a mandrel, an elastic layer, and a surface layer;

wherein, the surface layer comprises a titanium oxide film having chemical bonds represented by the following formula (1) and formula (2)

O—Ti—O Formula (1)

Ti—O—C Formula (2)

wherein an abundance ratio ($C_{C—C}/O_{C—O}$) is 3 or more and 8 or less, wherein Oc-o represents an abundance ratio of an oxygen atom bound to a carbon atom, ($O_{C—O}$), and Cc-c represents an abundance ratio of a carbon atom bound to a carbon atom, ($C_{C—C}$), in the titanium oxide film.

2. The electrophotographic member according to claim 1, wherein the titanium oxide film comprises a hydrolytic condensate of titanium tetraalkoxide represented by the following formula (3):

$Ti(OR)_4$ Formula (3)

(in the formula (3), R represents a linear or branched-chain alkyl group having 2 to 18 carbon atoms).

3. A process cartridge provided with an electrophotographic member according to claim 1, and configured to be attachable to and removable from a main body of an electrophotographic apparatus.

4. An electrophotographic apparatus provided with an electrophotographic member according to claim 1.

* * * * *